Jan. 12, 1932.    J. D. SCHWEERS    1,840,796
MASSAGE DEVICE
Filed May 20, 1930
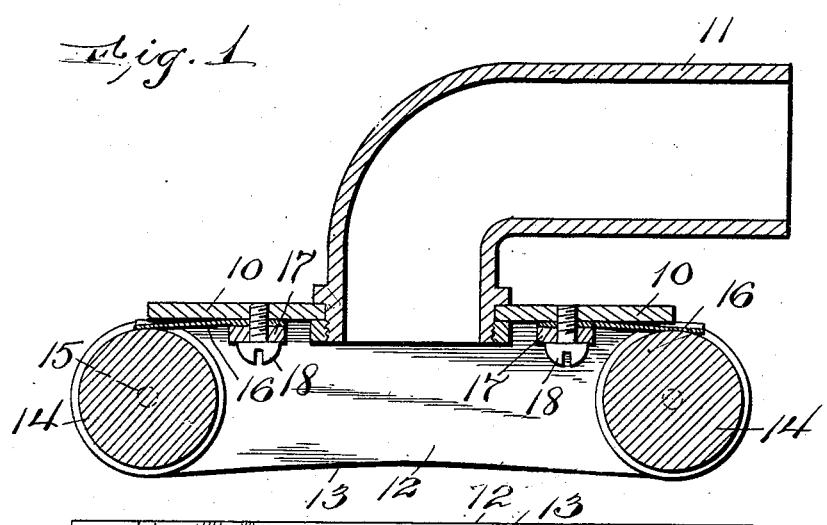
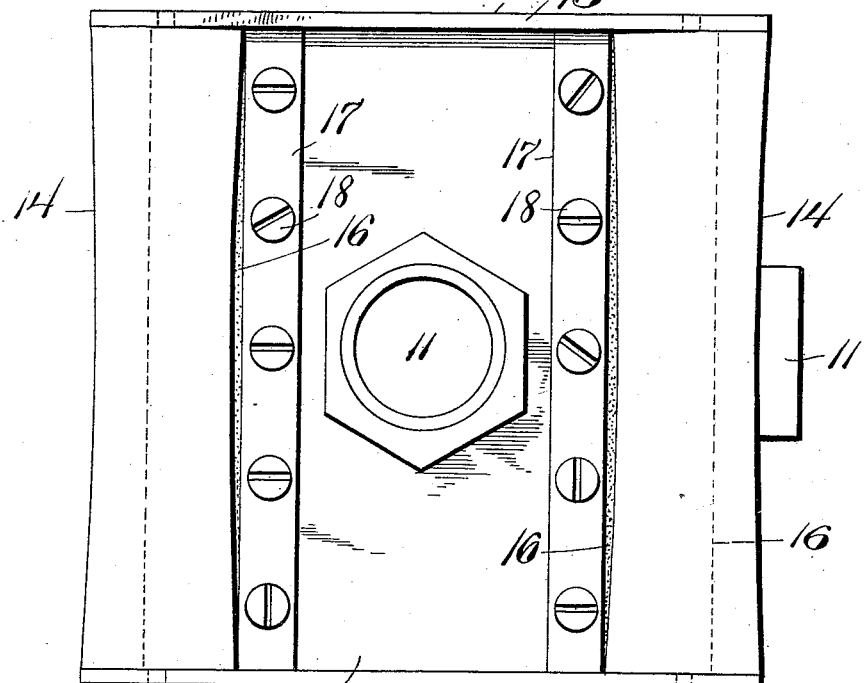

Patented Jan. 12, 1932

1,840,796

UNITED STATES PATENT OFFICE

JOHN D. SCHWEERS, OF ROSELLE PARK, NEW JERSEY

MASSAGE DEVICE

Application filed May 20, 1930. Serial No. 453,935.

This invention relates to an improved massage device adapted to be used on the skin while secured on a vacuum or suction tube. This type of massage device is credited with more thorough massaging because it draws the skin and muscle up between two rollers and this gives it more of a rolling treatment and insures the thorough stimulation desired.

The object of the invention is to cheaply provde an efficient device in which the action of the rollers on the skin is complete as the rollers are not guarded against thorough and full contact and this is combined with a practically air-tight construction between the rollers and the casing of the device and made more complete with an increase in suction.

The invention is illustrated in the accompanying drawings in which Figure 1 is a central longitudinal section showing an article embodying my invention and Figure 2 is a bottom view thereof.

The device comprises a casing having a pipe for attachment to a suction pipe such as used in shops or it can be attached to a vacuum cleaner for home use.

The casing illustrated comprises a top plate 10 with a hose connection 11 which can also be used as a handle. The connection 11 slides in a suction pipe in the usual manner of securing attachments to a vacuum pipe. The casing also includes side walls 12 which have bottom edges 13 slightly curved to allow the device to be passed easily over rounded portions of the body.

At each end of the device is a roller 14 which rollers are fitted closely between the side walls to form a fairly tight joint and rotate on the pins or screws 15 which form journals for the rollers. The particular form of journal can be varied at will.

Between the rollers and the casing is a resilient means for closing this part of the device in order to make the suction more effective on the skin I show the strips or small aprons 16 which rest on the rollers 14 and are secured to the under side of the top plate 10. The strips or flaps may be secured by the cleats 17 held by the screws 18. I find thin leather an excellent material for the purpose of the strips although rubber and other materials may be employed.

I claim:—

1. A massage device for use on a suction tube, comprising a casing with a tube on the top and side walls to engage the skin, rollers forming ends on the casing, and flaps to rest on the rollers to insure suction to the skin when the device is being used.

2. A massage device for use on a suction tube comprising a casing including a top plate having a suction pipe and including side walls depending from the top plate, rollers journalled in the side walls and forming ends on the casing, and resilient strips on the casing and engaging the rollers to insure closure between the rollers and the top plate.

3. A massage device for use on a suction tube comprising a casing including a top plate having a suction pipe and including side walls depending from the top plate, concave rollers journalled in the side walls and forming ends on the casing and resilient strips secured to the top plate and engaging the rollers.

4. A massage device for use on suction tubes comprising a casing having a suction pipe at the top, rollers journalled in the sides of the casing and forming the ends of the device, flaps secured to the casing and resting on the rollers and resilient enough to be drawn against the rollers by suction to insure a tight joint.

In testimony whereof he affixes his signature.

JOHN D. SCHWEERS.